(12) United States Patent
Watarai

(10) Patent No.: US 8,657,693 B2
(45) Date of Patent: Feb. 25, 2014

(54) TORSIONAL SHOCK ABSORBING APPARATUS

(75) Inventor: Shinichiro Watarai, Handa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/513,273

(22) PCT Filed: Dec. 3, 2009

(86) PCT No.: PCT/JP2009/006578
§ 371 (c)(1),
(2), (4) Date: Jun. 1, 2012

(87) PCT Pub. No.: WO2011/067815
PCT Pub. Date: Jun. 9, 2011

(65) Prior Publication Data
US 2012/0238368 A1    Sep. 20, 2012

(51) Int. Cl.
*F16F 15/121*        (2006.01)

(52) U.S. Cl.
USPC ...................... 464/68.92

(58) Field of Classification Search
USPC .......... 464/66.1, 68.1, 68.6, 68.9, 68.92, 152;
192/204, 205
See application file for complete search history.

(56) References Cited

U.S. PATENT DOCUMENTS

| | | | |
|---|---|---|---|
| 4,467,905 A | 8/1984 | Takeuchi | |
| 4,537,296 A * | 8/1985 | Lech et al. | 192/204 X |
| 5,322,149 A * | 6/1994 | Szadkowski | |
| 6,923,725 B2 | 8/2005 | Takeuchi et al. | |
| 7,314,427 B2 * | 1/2008 | Sakai et al. | |
| 8,210,951 B2 * | 7/2012 | Schober et al. | 464/68.9 |
| 2005/0087418 A1 | 4/2005 | Ishikawa et al. | |
| 2009/0272614 A1 | 11/2009 | Watarai | |

FOREIGN PATENT DOCUMENTS

| | | | |
|---|---|---|---|
| JP | 57 173620 | 10/1982 | |
| JP | 9 280317 | 10/1997 | |
| JP | 2001 074102 | 3/2001 | |
| JP | 2001 304341 | 10/2001 | |
| JP | 2003 194095 | 7/2003 | |
| JP | 2005 127448 | 5/2005 | |
| JP | 2008 20075 | 1/2008 | |
| JP | 2008 025629 | 2/2008 | |
| SU | 661132 * | 5/1979 | 464/68.2 |
| WO | WO 2009/033638 A1 * | 3/2009 | |

OTHER PUBLICATIONS

International Search Report issued on Feb. 16, 2010 in PCT/JP09/006578 filed on Dec. 3, 2009.

* cited by examiner

*Primary Examiner* — Gregory Binda
(74) *Attorney, Agent, or Firm* — Oblon, Spivak, McClelland, Maier & Neustadt, L.L.P.

(57) ABSTRACT

The torsional shock absorbing apparatus includes a boss, a cam member provided on the boss to be integrally rotated with the boss and having a cam surface formed in an oval shape, and an arm member disposed between the cam member and a coil spring to transmit the rotation torque of the disc plates to the boss. The arm member has one end portion held in contact with the cam surface and the other end portion held in engagement with circumferential one end portion of the coil spring, and is swingable around the center of a pin provided on the disc plates.

6 Claims, 11 Drawing Sheets

TORSIONAL SHOCK ABSORBING APPARATUS

TECHNICAL FIELD

The present invention relates to a torsional shock absorbing apparatus, and more particularly a torsional shock absorbing apparatus for relatively rotatably connecting a driving rotation member inputted with a rotation torque and a driven rotation member for outputting the rotation torque of the driving rotation member through a resilient member.

BACKGROUND ART

Up until now, there has been known a torsional shock absorbing apparatus which is constructed to drivably connect a driving source such as an internal combustion engine, a driving motor and the like with rotation wheels to transmit a rotation torque from the driving source to the rotation wheels, and to absorb torsional vibrations between the driving source and a power transmission train having sets of transmission gears.

The torsional shock absorbing apparatus of this kind is exemplified to comprise a driving rotation member selectively engageable or disengageable from a flywheel forming part of the driving source, a driven rotation member drivably connected with an input shaft forming part of a transmission, and a pair of resilient members having the driving rotation member and the driven rotation member resiliently connected with each other in the circumferential direction (for example see Patent Document 1).

The driving rotation member is constituted by a clutch disc, and a pair of disc plates disposed radially inwardly of the clutch disc, while the driven rotation member is constituted by a hub disposed between the disc plates to be rotated together with the input shaft of the transmission and axially slidable with respect to the input shaft.

The hub has a cylindrical boss splined to the input shaft and a flange extending radially outwardly and formed in a disc-like shape. Each of the resilient members is constituted by a coil spring accommodated in each of windows formed in the flange and has circumferential both ends supported on the ends of the windows respectively formed in the pair of disc plates.

The torsional shock absorbing apparatus thus constructed in the above description is operative to have the clutch disc and the pair of disc plates relatively rotated with the hub, whereupon the coil springs are circumferentially compressed by the relative rotation of the clutch disc and the pair of disc plates with the hub, so that the torsional vibrations inputted from the driving rotation member to the driven rotation member can be absorbed and attenuated by the coil springs.

On the other hand, it is known that the torsional vibrations tend to cause in the transmission noises which occasionally come to be causes for abnormal sounds in the idling operation of the vehicle, abnormal sounds in the travelling operation of the vehicle, and muffled sounds. Therefore, it is required to suitably set the torsional characteristic of the torsional shock absorbing apparatus in order to absorb the torsional vibrations leading to the causes for the abnormal sounds.

Here, it has so far been known that as the abnormal sounds at the time of the idling operation of the vehicle, abnormal sounds called "garagara", so called, "gara sounds" are caused by the collisions of the idling gear pairs in the no load state of the vehicle forming part of transmission gear sets by the torsion vibrations originated from the rotation fluctuation caused by the torque fluctuation of the internal combustion engine when the vehicle is under the idling operation immediately after being changed to the neutral operation.

On the other hand, it has so far been known that as the abnormal sounds at the time of the travelling operation of the vehicle, abnormal sounds called "jarajara", so called, "jara sounds" are caused by the collisions of the idling gear pairs of the transmission gear sets by the torsional resonance of the power transmission train and by torsional vibrations originated from the rotation fluctuation caused by the torque fluctuation of the power transmission train when the vehicle is under the acceleration and deceleration operations.

Further, it has so far been known that as muffled sounds, abnormal sounds are caused in the vehicle room by the vibrations caused by the torsional resonance of the power transmission train originated from the torque fluctuation of the power transmission train. The torsional resonance of the power transmission train is usually caused under the usual travelling state (for example around 2500 rpm of the rotation number of the internal combustion engine), thereby resulting in generating the muffled sounds in the usual travelling state.

Conventionally, there have so far been known a torsional shock absorbing apparatus disclosed in for example Patent Document 2 as a torsional shock absorbing apparatus having a torsional characteristic suitably set. The known torsional shock absorbing apparatus comprises a cylindrical boss constituting a driven rotation member, and a disc-like flange radially outwardly from the boss, the boss and the flange being divided into two respective sections. Between the outer peripheral portion of the boss and the inner peripheral portion of the flange is disposed a small coil spring having a small spring constant to absorb the torsional vibrations.

A pair of disc plates has first widow portions and second widow portions respectively formed therein, the first widow portions and the second window portions being spaced apart from each other in the circumferential direction of the disc plates. The flange is formed with a first window and a second window which are in opposing relationship with the first window portions and the second window portions of the disc plates. In the first windows of the disc plates and the first windows of the flange are accommodated first coil springs, and first seat members, respectively, each of the first coil springs having a spring constant larger than the small coil spring.

In the second windows of the disc plates and the second windows of the flange are accommodated second coil springs, and second seat members, respectively, each of the second coil springs having a spring constant larger than the small coil spring.

The first sheet member has a gap circumferentially extending from the first window portion, and the first coil spring is not compressed in the area where the torsional angle is small when the second coil spring is compressed, and the first coil spring is compressed in the area where the torsional angle is large.

The torsional characteristic of the driving rotation member and the driven rotation member in the torsional shock absorbing apparatus is shown in FIG. 11.

In the area where the torsion angle of the clutch disc and the hub is small as in the state that the vehicle under the idling operation is changed to the neutral operation, the torsional shock absorbing apparatus is operative to have only the small coil spring compressed, thereby suppressing the "gara sound" by lowering the rigidity of the torsional characteristic in the small torsion angle area.

On the other hand, in the large torsion angle, only the second torsion spring is compressed to obtain the intermediate rigidity of the torsional characteristic with the torque being slowly raised as shown by a reference symbol "a" in FIG. 11, thereby making it possible to suppress the muffled sound.

When the torsion angle is further increased to the predetermined level, the first coil spring and the second coil spring are concurrently compressed to obtain the high rigidity of the torsional characteristic with the torque increase ratio being raised as shown by a reference symbol "b" in FIG. 11, thereby making it possible to suppress the "jara sound" sound. In this way, the multi-staged torsional characteristic can be obtained.

The conventional torsional shock absorbing apparatus thus constructed, however, encounters such a problem that in the stepped portion (bent portion in the graph) with the transmission torque increase ratio being varied, there is caused gear colliding sounds of the gears transmitting the rotation torque in the transmission.

The sound thus caused has a low frequency which is called "ga sound". When the torque transmitted from the driving rotation member to the driven member is about zero degree and an abrupt fluctuation is caused at the stepped portion of the torsional characteristic for example at the time of the slow deceleration travelling of the vehicle, the conventional torsional shock absorbing apparatus also encounters such a problem that there are caused abnormal sounds such as gear colliding sounds caused by the rebound of the gears and other noisy sounds.

In view of this problem, another torsional shock absorbing apparatus is proposed and disclosed in the Patent Document 3 as a torsional shock absorbing apparatus which can suppress the "ga sound" by making the torsional characteristic in non-linear shape with no multi-stages to have the torsional characteristic formed with no stepped portion of the torque fluctuation.

The torsional shock absorbing apparatus disclosed in the Patent Document 3 comprises a driving rotation member integrally with an internal combustion engine, a driven rotation member disposed in coaxial relationship with and in relative rotational relationship with the driving rotation member, a displacement member having a contact portion movable along a contacted surface formed to have a curvature varied in response to the relative rotation angle of the driving rotation member and the driven rotation member, and relatively displaceable with respect to the driven rotation member with the contact portion being movable along the contacted surface in response to the relative rotation angle of the driving rotation member, a resilient member resiliently compressed and expanded in response to the relative displacement of the displacement member, and stopper portions respectively provided on the driving rotation member and the displacement member and held in engagement with each other to regulate the relative rotation of the driving rotation member and the displacement member and thus to regulate the relative rotation of the driving rotation member and the driven rotation member.

CITATION LIST

Patent Literature

{PTL1} Japanese Patent Application Publication No. 2003-194095
{PTL2} Japanese Patent Application Publication No. 2001-304341
{PTL3} Japanese Patent Application Publication No. 2001-74102

SUMMARY OF INVENTION

Technical Problem

However, the conventional torsional shock absorbing apparatus disclosed in the Patent Document 2 encounters such a problem that the "gara sounds" can be suppressed with the small coil spring being deformed, but it is difficult to structurally widen the torsion angle of the driving rotation member and the driven rotation member, resulting from the fact that many first and second coil springs and many first and second sheet members for absorbing the torque fluctuation are disposed in series, and is thus difficult to sufficiently suppress the "jara sounds" at the time of the travelling of the vehicle.

Further, the conventional torsional shock absorbing apparatus disclosed in the Patent Document 2 encounters such a problem that the torsion angle of the driving rotation member and the driven rotation member cannot be widened, and it is thus difficult to sufficiently suppress the "jara sounds" at the time of the travelling of the vehicle, resulting from the fact that the stopper portions are provided to be held in engagement with the driving rotation member and the displacement member though the "ga sounds" can be suppressed with the torsional characteristic of the driving rotation member and the driven rotation member being in non-linear shape.

Further, the conventional torsional shock absorbing apparatus disclosed in the Patent Document 3 is constructed to regulate the relative rotation of the driving rotation member and the driven rotation member, thereby resulting in the fact that there is a possibility that the transmission is transmitted with an extremely large torque from the driving rotation member to the driven rotation member when the driving rotation toque is transmitted with an extremely large torque from the internal combustion engine.

The present invention is made to overcome the previously mentioned problems encountered by the conventional torsional shock absorbing apparatus, and it is therefore an object of the present invention to provide a torsional shock apparatus which can obtain a torsional characteristic in a non-linear shape having a large torsion angle of the driving rotation member and the driven rotation member as well as to prevent the extremely large torque from being transmitted from the driving rotation member to the driven rotation member.

Solution to Problem

To achieve the previously mentioned object, the torsional shock absorbing apparatus according to the present invention, (1) comprises: a driving rotation member inputted with a rotational torque, a driven rotation member disposed in coaxial relationship with the driving rotation member to output the rotational torque of the driving rotation member, and at least one or more resilient members provided between the driving rotation member and the driven rotation member to be compressed in the circumferential direction of the driving rotation member when the driving rotation member and the driven rotation member are relatively rotated with each other, a cam member having a cam surface formed in an elliptical shape and provided at one of the driving rotation member and the driven rotation member to be integrally rotated with the one of the driving rotation member and the driven rotation member, and at least one or more torque transmission members each disposed between the cam member and the resilient member to transmit the rotational torque of the driving rotation member to the driven rotation member.

The above torsional shock absorbing apparatus comprises a cam member provided on the driven rotation member and having a cam surface formed in an elliptical shape, and a torque transmission member between the cam member and the resilient member, so that the torque transmission member can slide on and along the cam surface of the cam member to have the cam member urge the resilient member through the torque transmission member when the driving rotation member and the driven rotation member are relatively rotated with each other.

When the relative rotation of the driving rotation member and the driven rotation member, viz., the torsion angle of the driving rotation member and the driven rotation member is small, the torque transmission member urges the cam member to transmit the torque to the driven rotation member from the driving rotation member with the reaction force of the resilient member resiliently deformed.

Resulting from the fact that if the curvature of the cam surface is increased in response to the torsion angle increased of the driving rotation member and the driven rotation member, the resilient deformation of the resilient member can be increased, the cam member is strongly pressurized by the torque transmission member to enable the torque to be transmitted to the driven rotation member from the driving rotation member.

In this way, the resilient member is pressurized by the cam member through the torque transmission member in response to the rotation of the cam member having a cam surface formed in an elliptic shape, so that the reaction force from the resilient member to the torque transmission member can be varied. This means that the range of the torsion angle of the driving rotation member and the driven rotation member can be widened, and the torsional characteristic can be formed in a non-linear shape, thereby making it possible to smoothly transmit the rotation torque to the driven rotation member from the driving rotation member.

For this reason, the torsional shock absorbing apparatus intervening between the driving source of the vehicle and the transmission having transmission gear sets, the torsional rigidity of the driving rotation member and the driven rotation member can be decreased when the torsion angle of the driving rotation member and the driven rotation member is small. For this reason, in the small area of the torque in which the rotation torque to be transmitted to the driven rotation member from the driving rotation member like the time when the vehicle is changed to its neutral position under its idling operation state, the torsional vibrations originated from the rotational fluctuation caused by the torque fluctuation of the internal combustion engine can be attenuated, thereby making it possible to suppress the "gara sounds", i.e., rattling noises generated from the gear pairs of the transmission maintained in the no-load operation of the vehicle.

Due to the fact that the range of the torsion angle of the driving rotation member and the driven rotation member can be widened, during the acceleration and deceleration of the vehicle when the rotation torque transmitted to the driven rotation member from the driving rotation member is large, the torsional shock absorbing apparatus according to the present invention can attenuate the large torsional vibrations originated from the rotational fluctuation caused by the torque fluctuation of the internal combustion engine as well as can attenuate the torsional resonance of the power transmission train, thereby making it possible to suppress the "jara sounds", i.e., the rattling noises generated from the idling gear pairs of the transmission as well as the muffled sounds generated by the torsional resonance of the power transmission train. Further, the torsional shock absorbing apparatus according to the present invention can make the torsional characteristic formed in non-linear shape with no multi-staged portion as seen in the conventional apparatus, thereby making it possible to suppress the "ga sounds".

When the driving rotation member is rotated while being inputted with an extremely large torque, the torque transmission member can override the apex portion of the cam surface having the largest curvature. This makes it possible to have the driving rotation member idly rotated with respect to the driven rotation member, thereby making it possible to permit the cam member to function as a torque limiter. As a result, the torsional shock absorbing apparatus according to the present invention can prevent the extremely large torque from being transmitted from the driving rotation member to the driven rotation member, and thus can protect the transmission gear sets of the transmission.

In the torsional shock absorbing apparatus as set forth in the definition (1), (2) each of the torque transmission members comprises an arm member having one end portion held in contact with the cam surface of the cam member and the other end portion held in engagement with the circumferential one end portion of the resilient member, and swingably supported on and around a swing fulcrum portion provided on another of the driving rotation member and the driven rotation member.

The torsional shock absorbing apparatus is constructed to have an arm swingably supported on and around a swing fulcrum portion provided on for example the driving rotation member, the arm member having one end portion held in contact with the cam surface of the cam member and the other end portion held in engagement with the circumferential one end portion of the resilient member, so that the resilient member is connected with the cam member through the arm member.

For this reason, the torsional shock absorbing apparatus can be made simple in construction only with the resilient member, the arm member and the cam member mounted thereon, and this simple construction can widen the torsion angle of the driving rotation member and the driven rotation member, thereby making it possible to produce the torsional shock absorbing apparatus simple in construction.

In the torsional shock absorbing apparatus as set forth in the definition (1) or (2), (3) the cam member has an initial position where the driving rotation member and the driven rotation member are twisted at a smallest torsion angle, and the cam surface of the cam member has a curvature increased in response to the torsion angle increased from the initial position of the cam member.

The above torsional shock absorbing apparatus is constructed to allow the cam surface of the cam member, held in contact with the torque transmission member, to have a curvature varied in response to the torsion angle of the driving rotation member and the driven rotation member varied, thereby making possible to widen the range of the torsion angle of the driving rotation member and the driven rotation member as well as to make the torsional characteristic of the driving rotation member and the driven rotation member in the non-linear shape.

The torsional rigidity of the driving rotation member and the driven rotation member can be increased in response to the increased torsion angle of the driving rotation member and the driven rotation member, thereby making it possible to smoothly transmit the rotation torque to the driven rotation member from the driving rotation member.

In the torsional shock absorbing apparatus as set forth in the definition (1) to (3), (4) the torque transmission members are disposed in point-symmetrical relationship with each other with respect to the center axis of the driving rotation member.

The above torsional shock absorbing apparatus is constructed to have the arm members disposed in point-symmetrical relationship with each other with respect to the center axis of the driving rotation member, thereby leading to the fact that the cam member is sandwiched between and retained by the arm members.

This results in the fact that the cam member is sandwiched between and retained by the torque transmission members under strong pressing forces caused by the reaction force of the resilient members when the cam member urges the resilient members through the torque transmission members. For this reason, the torsional shock absorbing apparatus according to the present invention can more reliably transmit the rotation torque to the driven rotation member from the driving rotation member, and thus can reliably integrally rotate the driven rotation member and the driving rotation member.

In the torsional shock absorbing apparatus as set forth in the definition (2) to (4), (5) the driven rotation member has an outer peripheral portion having the cam member, and an inner peripheral portion provided with a first rotation member drivably connected with an input shaft of a transmission, the driving rotation member has a pair of second rotation members disposed at the axially both ends of the first rotation member and in spaced relationship with and secured with each other, the driving rotation member having an accommodation portion to circumferentially extend for accommodating the resilient member therein, and a pair of retaining members supporting the circumferential both end portions of the resilient member to have the resilient member supported on the circumferential both end portions of the accommodation portion, the other end portion of the arm member being held in engagement with the circumferential one end portion of the resilient member through one of the retaining members.

The above torsional shock absorbing apparatus is constructed to have the driving rotation member have a pair of second rotation members disposed at the axially both ends of the first rotation member and in spaced relationship with and secured with each other, the driving rotation member having an accommodation portion to circumferentially extend for accommodating the resilient member therein, and a pair of retaining members supporting the circumferential both end portions of the resilient member to have the resilient member supported on the circumferential both end portions of the accommodation portion, the other end portion of the arm member being held in engagement with the circumferential one end portion of the resilient member through one of the retaining members. This means that the range of the torsion angle of the driving rotation member and the driven rotation member can be widened, and the torsional characteristic can be formed in a non-linear shape, thereby making it possible to smoothly transmit the rotation torque to the driven rotation member from the driving rotation member.

In the torsional shock absorbing apparatus as set forth in the definition (2) to (5), (6) the swing fulcrum portion is constituted by a pin bridged and supported on the pair of second rotation members, the arm member being disposed between the pair of second rotation members and swingably supported on the pin.

The above torsional shock absorbing apparatus is constructed to have the arm member disposed between the pair of second rotation members and swingably supported on the pin, thereby making it possible to make the torsional shock absorbing apparatus simple in construction and to have the arm member supported on the pair of second rotation members with the simple construction. The construction of the pair of second rotation members connected by the pin makes it possible to integrate the pair of second rotation members with the simple construction.

In the torsional shock absorbing apparatus as set forth in the definition (2) to (5), (7) the swing fulcrum portion is constituted by a bent portion formed on one of the pair of second rotation members, the bent portion being formed by bending its radially outer portion in an axially inward direction toward the other of the pair of second rotation members to extend in the circumferential direction of the second rotation members, and having a predetermined length, the arm member is disposed between the pair of second rotation members, and has a desired outer peripheral surface held in slidable contact with the inner peripheral surface of the bent portion to allow the arm member to be swingable on the inner peripheral surface of the bent portion.

The above torsional shock absorbing apparatus is constructed to have a bent portion formed on one of the pair of second rotation members, the bent portion being formed by bending its radially outer portion in an axially inward direction toward the other of the pair of second rotation members to extend in the circumferential direction of the second rotation members, and the arm member being disposed between the pair of second rotation members and having a desired outer peripheral surface held in slidable contact with the inner peripheral surface of the bent portion to allow the arm member to be swingable on the inner peripheral surface of the bent portion, so that the torque fluctuation absorbing apparatus can be made simple in construction and thus can have the pair of second rotation members support the arm member with the simple construction.

For this reason, the range of the torsion angle of the driving rotation member and the driven rotation member can be widened, and the torsional characteristic of the driving rotation member and the driven rotation member can be made in the non-linear shape.

Further, the above torsional shock absorbing apparatus is constructed to have the arm member have a desired outer peripheral surface held in slidable contact with the inner peripheral surface of the bent portion, so that when the torsion angle of the driving rotation member and the driven rotation member is increased to enlarge the reaction force from the resilient member to the torque transmission member, the arm member is compressed to the inner peripheral surface of the bent portion under a strong pressing force. As a consequence, the sliding resistance between the outer peripheral surface of the arm member and the inner peripheral surface at the time of the swinging motion of the arm member can be increased to generate a relatively large hysteresis.

For this reason, the hysteresis between the driving rotation member and the driven rotation member can be increased when the torsional resonance of the power transmission train having the transmission is generated at the acceleration and deceleration times of the vehicle. This means that the torsional resonance can be even further suppressed, and the muffled sounds can be even further suppressed from being generated.

Advantageous Effects of Invention

The present invention can provide a torsional shock apparatus which can obtain a torsional characteristic in a non-linear shape having a large torsion angle of the driving rotation member and the driven rotation member, and can prevent the extremely large torque from being transmitted from the driving rotation member to the driven rotation member.

DESCRIPTION OF EMBODIMENTS

The preferred embodiments of the torsional shock absorbing apparatus according to the present invention will be described hereinafter with reference to the accompanying drawings.

Example 1

FIGS. 1 to 8 show the first embodiment of the torsional shock absorbing apparatus according to the present invention.

Firstly, the construction of the first embodiment of the torsional shock absorbing apparatus according to the present invention will be explained hereinafter.

Figure 1:
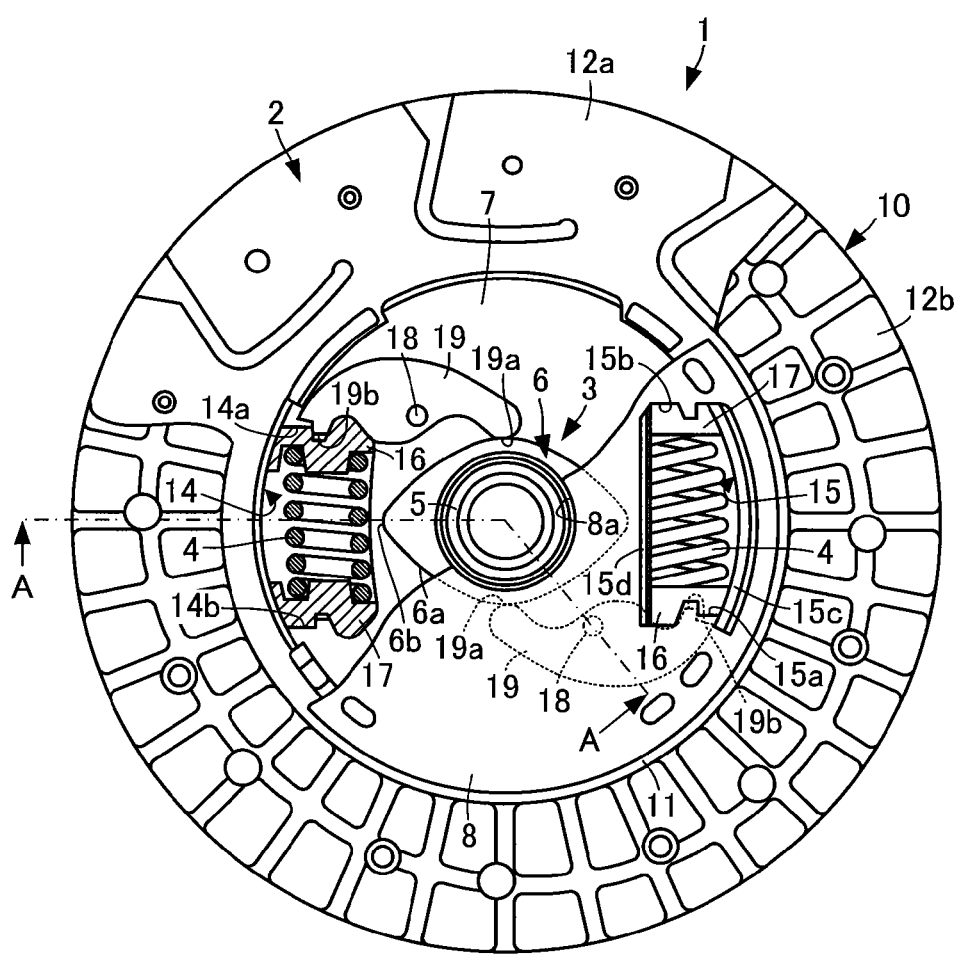
FIG. 1 is a view of a first embodiment of the torsional shock absorbing apparatus according to the present invention, and a front view of the torsional shock absorbing apparatus.
Figure 2:
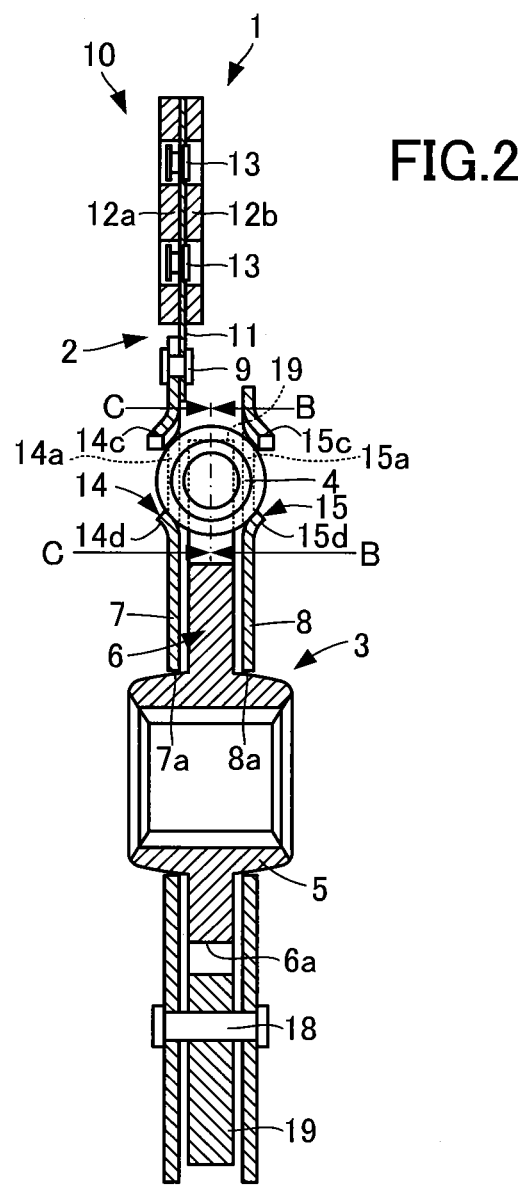
FIG. 2 is a view of the first embodiment of the torsional shock absorbing apparatus according to the present invention, and a cross-sectional view taken on and seen from the line A-A in FIG. 1.

In FIGS. 1 and 2, the torsional shock absorbing apparatus 1 comprises a driving rotation member 2 inputted with a rotational torque from a combustion engine, not shown, serving as a driving source, and a driven rotation member 3 provided in coaxial relationship with the driving rotation member 2 to transmit the rotational torque of the driving rotation member 2 to a transmission forming part of a power transmission train, not shown, and a pair of coil springs 4 respectively serving as resilient members and provided between the driving rotation member 2 and the driven rotation member 3 to be compressed circumferentially of the driving rotation member 2 when the driving rotation member 2 and the driven rotation member 3 are relatively rotated with each other.

The driven rotation member 3 is constituted by a boss 5 serving as a first rotation member splined to the outer peripheral portion of an input shaft, not shown, forming part of the transmission of the power transmission train, and a cam member 6 provided on the peripheral portion of the boss 5.

Further, the boss 5 and the cam member 6 may be integrally formed. The boss 5 and the cam member 6 may separately be formed from each other with the boss 5 having an outer peripheral portion formed with a spline portion and the cam member 6 having an inner peripheral portion formed with a spline portion, thereby establishing a splined connection through the respective spline portions between the outer peripheral portion of the boss 5 and the inner peripheral portion of the cam member 6.

The driving rotation member 2 is provided with the disc plates 7, 8 and the clutch disc 10 which form in combination a second rotation member. The disc plates 7, 8 are disposed at the axial both ends of the boss 5 and axially spaced apart from each other at a predetermined interval. Under these conditions, the disc plates 7, 8 are secured to each other by a pair of pins 18 serving as swing fulcrum portions, respectively. The boss 5 is accommodated in circular center windows 7a, 8a respectively formed in the disc plates 7, 8, and disposed coaxially with the disc plates 7, 8.

Each of the pins 18 is bridged between the disc plates 7, 8 has axial both end portions enlarged in diameter to prevent the disc plates 7, 8 from being removed from their original positions. This means that the disc plates 7, 8 can be integrally rotated by the pins 18.

The clutch disc 10 is disposed radially outwardly of the disc 7, and provided with a cushioning plate 11 and a pair of friction materials 12a, 12b. The cushioning plate 11 is made of a ring-shaped material corrugated in the thickness thereof, and firmly connected with the disc plate 7 by rivets 9.

The friction plates 12a, 12b are secured to the both surfaces of the cushioning plate 11 by rivets 13. The friction plates 12a, 12b are positioned between a flywheel not shown and a pressure plate of a clutch cover, the flywheel being drivably connected with a crankshaft of an internal combustion engine, while the clutch cover being bolted to the flywheel.

The friction plates 12a, 12b pressurized by the pressure plate to be brought into frictional engagement with the flywheel and the pressure plate cause the rotation torque of the internal combustion engine to be inputted to the disc plates 7, 8.

The depression of a clutch pedal not shown causes the pressure plate to release the friction materials 12a, 12b from being pressurized by the pressure plate and to have the friction materials 12a, 12b spaced apart from the flywheel, so that the rotation torque of the internal combustion engine is not input to the disc plates 7, 8.

The disc plates 7, 8 are respectively formed with a pair of accommodation windows 14, 15 circumferentially spaced apart from each other and disposed in opposing relationship with each other in the axial direction of the disc plates 7, 8 to accommodate therein the coil springs 4, respectively. The accommodation windows 14, 15 thus formed in the disc plates 7, 8 constitute accommodation portions to accommodate the coil springs 4, respectively.

The accommodation windows 14, 15 are formed by being punched out with a stamping press at the positions of the disc plates 7, 8 corresponding to the outer peripheral portions of the coil springs 4, and thus have respective circumferential end portions forming closed ends, respectively.

Figure 3:
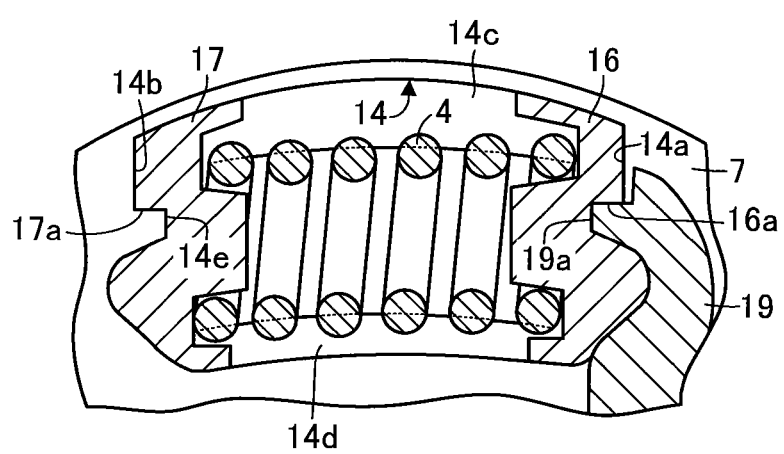
FIG. 3 is a view of the first embodiment of the torsional shock absorbing apparatus according to the present invention, and a cross-sectional view taken on and seen from the line B-B in FIG. 2.
Figure 4:
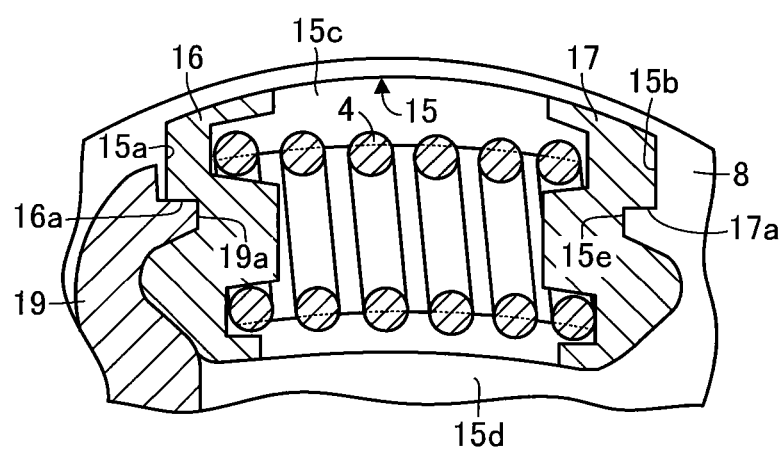
FIG. 4 is a view of the first embodiment of the torsional shock absorbing apparatus according to the present invention, and a cross-sectional view seen from the arrow C in FIG. 2.

As shown in FIGS. 2 to 4, the disc plates 7, 8 respectively have outer supporting edge portions (accommodation portions) 14c, 15c circumferentially extending along the radially outer edges of the accommodation windows 14, and inner supporting edge portions (accommodation portions) 14d, 15d circumferentially extending along the radially outer edges of the accommodation windows 14. The outer supporting edge portions (accommodation portions) 14c, 15c and the inner supporting edge portions (accommodation portions) 14d, 15d are bent and projected axially outwardly of the disc plates 7, 8.

The circumferential end portions of each of the coil springs 4 are supported by spring seats 16, 17 serving as retaining members, respectively. The spring seats 16, 17 have respective inner peripheral portions formed with winding roll seats, respectively.

The winding roll seats are corresponding to one or two windings of the circumferential both end portions of the coil spring 4. The winding roll seats allow the circumferential both end portions of the coil spring 4 to seat thereon to bring the winding starting and finishing ends of the coil spring 4 into engagement with the winding roll seats, so that the coil spring 4 can be prevented from being rotated with respect to the spring seats 16, 17 in the state in which the circumferential both end portions of the coil spring 4 are seated on the spring seats 16, 17, respectively.

As shown in FIGS. 3, 4, the closed ends of the circumferential end portions of the accommodation windows 14, 15 formed in the disc plates 7, 8 respectively constitute engagement portions 14a, 14b, 15a, 15b with which the circumferential both end portions of the spring seats 16, 17 are engaged, and thus the circumferential both end portions of the spring seats 16, 17 are engaged with the engagement portions 14a, 14b, 15a, 15b of the accommodation windows 14, 15.

The outer peripheral portions of the spring seats 16, 17 are held in opposing relationship with the outer supporting edge portions 14c, 15c, and the inner supporting edge portions 14d, 15d of the disc plates 7, 8 to prevent the spring seats 16, 17 from being removed from the accommodation windows 14, 15 by the outer supporting edge portions 14c, 15c, and the inner supporting edge portions 14d, 15d.

Between one of the spring seat 16 and the cam member 6 is provided an arm member 19, serving as a torque transmission member, which are disposed between the disc plates 7, 8 and swingably supported on the disc plates 7, 8 by a pin 18.

The arm member 19 has one end portion 19a held in engagement with the cam surface of the cam member 6, and the other end portion 19b held in engagement with the circumferential one end portion of the spring seat 16.

The circumferential one end portion of the spring seat 16 is formed with a cavity portion 16a, and the other end portion 19b of the arm member 19 is formed to have a projected tip end. The other end portion 19b of the arm member 19 is snugly fitted with the cavity portion 16a of the spring seat 16. This makes it possible to engage the other end portion 19b of the arm member 19 with the cavity portion of the spring seat 16 in reliable and stable manners.

The circumferential one end portions of the spring seats 17 are formed with cavity portions 17a, respectively, and the engagement portions 14b, 15b of the accommodation windows 14 are formed with projections 14e, 15e, respectively. The spring seats 16 are reliably received in and retained by the accommodation windows 14, 15, respectively, with the cavity portions 17a being snugly fitted with the projections 14e, 15e, respectively.

As a consequence, the spring seats 16 can smoothly be moved toward and away from the spring seats 17 along the peripheral edges of the accommodation windows 14, 15.

The cam member 6 has a cam surface 6a formed in an elliptic shape and having a curvature. This curvature is increased as the torsion angle of the disc plates 7, 8 and the boss 5 is increased from the initial position of the cam member 6 where the torsion angle of the disc plates 7, 8 and the boss 5 is at a minimum level.

Therefore, the cam member 6 in the present embodiment is set to take an initial position where the one end portions 19a of the arm members 19 are engaged with the cam surface 6a taking a small curvature when the torsion angle of the disc plates 7, 8 and the boss 5 is at a minimum level.

The arm members 19 are arranged in point-symmetrical relationship with each other with respect to the common center axis of the disc plates 7, 8. The arm members 19 have the respective one end portions 19a held in engagement with the cam surface 6a having two surface sections of the same in curvature with respect to the common center axis of the disc plates 7, 8.

Next, the operation will be described hereinafter.

Figure 5:
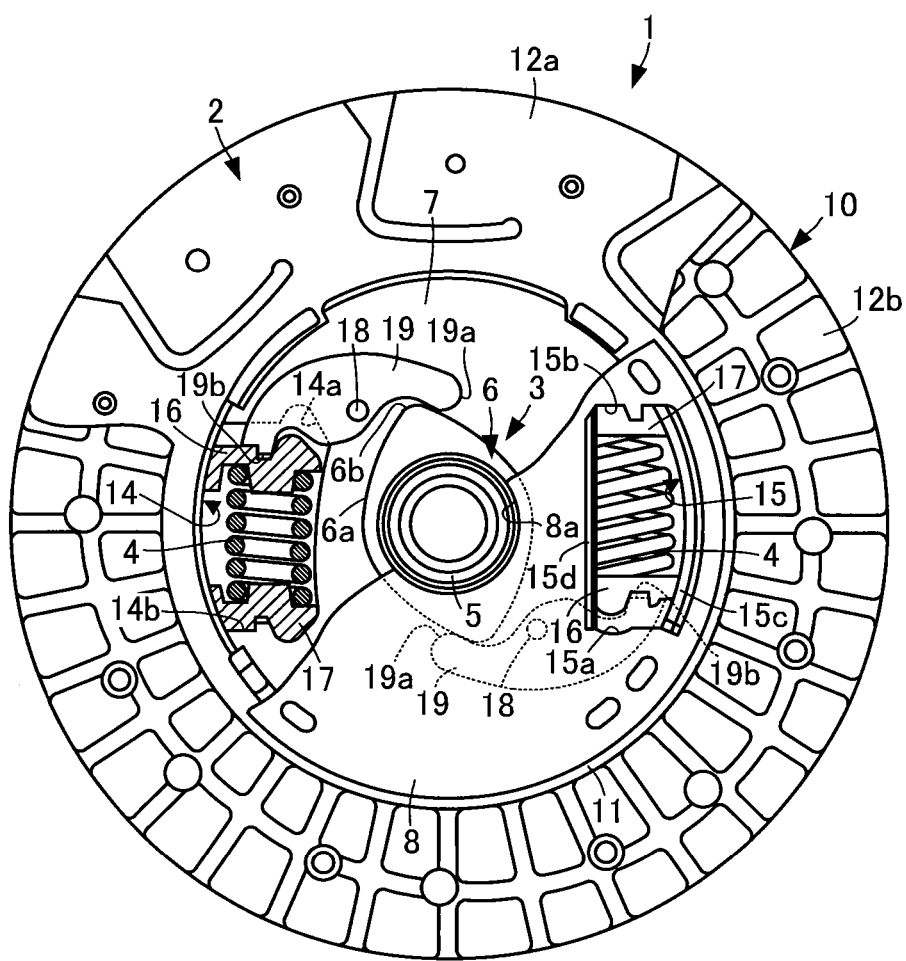
FIG. 5 is a view of the first embodiment of the torsional shock absorbing apparatus according to the present invention, and a front view of the torsional shock absorbing apparatus having a large torsion angle formed by disc plates and a hub forming parts of the torque fluctuation absorbing apparatus.
Figure 6:
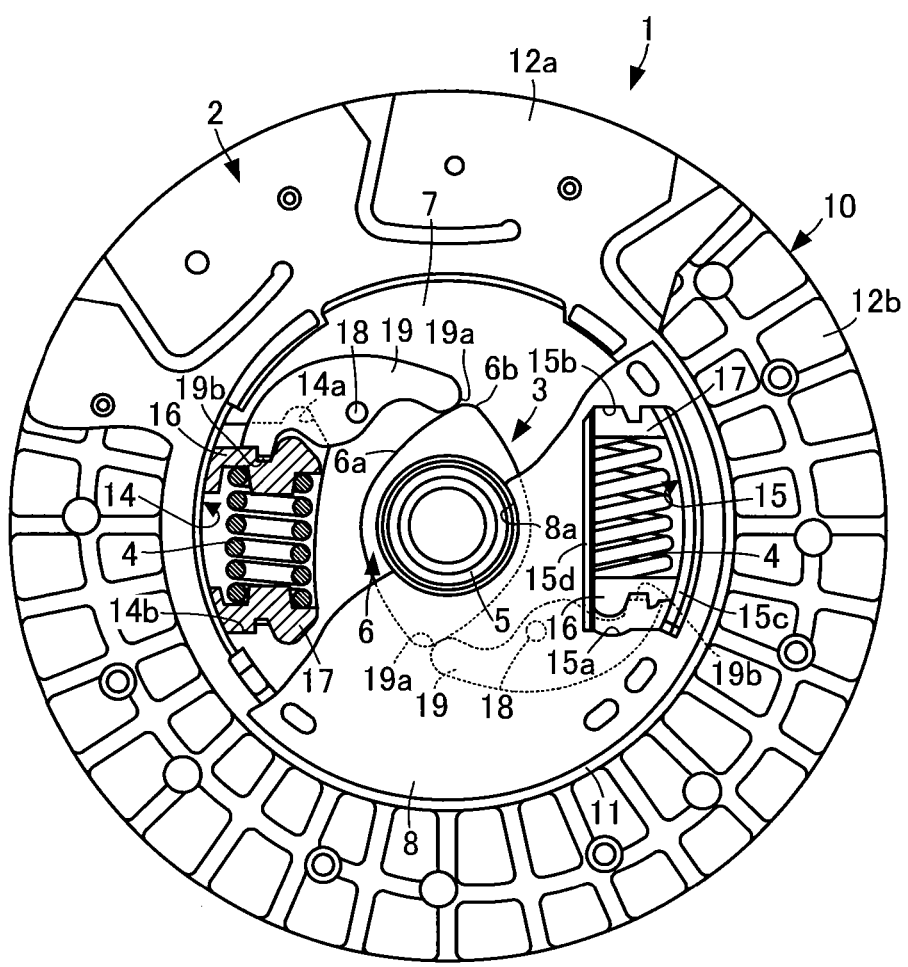
FIG. 6 is a view of the first embodiment of the torsional shock absorbing apparatus according to the present invention, and a front view of the torsional shock absorbing apparatus having the disc plates inputted with an excessive torque.

FIGS. 1, 5 and 6 show a state in which the disc plates 7, 8 are rotated in an anti-clockwise direction by the rotation torque of the internal combustion engine. The following explanation will be made for the sake of convenience on the assumption that the boss 5 is rotated with respect to the disc plates 7, 8 in a clockwise direction in FIGS. 1, 5 and 6.

In the state that the relative rotation of the disc plates 7, 8 and the boss 5 is small, viz., the torsion angle of the disc plates 7, 8 and the boss 5 is small in the vicinity of 0 degree, the cam member 6 takes the initial position and is integrally rotated with the boss 5 as shown in FIG. 1.

At this time, the one end portions 19a of the arm members 19 are held in slidable contact with the cum surface 6a having a small curvature of the cam member 6, and the cam member 6 urges the arm members 19 to be pressed to the spring seats 16, so that the coil springs 4 are urged by the cam member 6.

At this time, the reaction forces of the coil springs 4 cause the arm members 19 to be swung around the pins 18, respectively, and to pressurize the cam member 6 by the principle of the lever. For this reason, the rotation torque of the disc plates 7, 8 is transmitted to the cam member 6 through the coil springs 4 and the arm members 19 to rotate the boss 5, so that the rotation torque of the internal combustion is transmitted to the input shaft of the transmission.

A this time, each of the coil springs 4 has a small compression amount, thereby leading to making small the torsional rigidity of the disc plates 7, 8 and the boss 5.

On the other hand, the disc plates 7, 8 and the boss 5 are relatively rotated with each other to increase the torsion angle of the disc plates 7, 8 and the boss 5. As the torsion angle of the disc plates 7, 8 and the boss 5
is increased, the cam member 6 is rotated to have the one end portions 19a of the arm members 19 slide on and along the cam surface 6a of the cam member 6.

The curvature of the cam surface 6a is increased as the torsion angle of the disc plates 7, 8 and the boss 5 is increased from the initial position of the cam member 6, so that the urging forces of the arm members 19 to urge the coil springs 4 are gradually increased in response to the clockwise rotation of the cam member 6.

As shown in FIGS. 3 and 4, the circumferential one end portions of the spring seats 17 are held in engagement with the engagement portions 14b, 15b, so that the spring seats 16 are moved toward the spring seats 17 along the circumferential edges of the accommodation windows 14, 15, respectively, to compress the coil springs 4.

The urging forces of the arm members 19 to urge the coil springs 4 cause the coil springs 4 to be compressed, thereby generating the reaction force of the coil springs 4 which in turn rotate the arm members 19 around the respective pins 18 and thus compress the cam member 6 by the principle of the level with strong pressing forces acting on the cam surface 6a. The rotation torque of the disc plates 7, 8 is transmitted to the cam member 6 by way of the coil springs 4 and the arm members 19.

When the one end portions of the arm members 19 reach their respective positions before the apex portions of the cam surface 6a each having the largest curvature among other surface sections as shown in FIG. 5, the cam member 6 urges the coil springs 4 through the arm members 19 with the larger urging force, thereby leading to making the reaction forces of the coil springs 4 even larger.

In this way, the urging force caused by the cam member 6 to the coil springs 4 is increased in response to the increased torsion angle of the disc plates 7, 8 and the boss 5, thereby making it possible to increase the torsion rigidity of the disc plates 7, 8 and the boss 5.

FIGS. 1 and 5 show the state in which the disc plates 7, 8 and the boss 5 are twisted to the positive side (acceleration side). When the disc plates 7, 8 and the boss 5 are twisted to the negative side (deceleration side), the cam member 6 is rotated in the anti-clockwise direction with respect to the disc plates 7, 8 from the initial position. As the cam member 6 is rotated in the clockwise direction with respect to the disc plates 7, 8, the curvature of the cam surface 6a on which the one end portions of the arm members 19 becomes increased.

As previously mentioned, the torsional shock absorbing apparatus 1 according to the present embodiment comprises a boss 5, a cam member 6 and a pair of arm members 19. The cam member 6 is disposed at the outer peripheral portion of the boss 5, and is rotatable together with the boss 5. The cam member 6 has a cam surface 6a formed to have such a surface shape that the curvature of the cam surface 6a is increased as the torsion angle of the disc plates 7, 8 and the boss 5 is increased from the initial position where the torsion angle of the disc plates 7, 8 and the boss 5 is at a minimum level. The arm members 19 are disposed between the cam member 6 and the coil springs 4, and each has one end portion 19a held in contact with the cam surface 6a, and the other end portion 19b held in engagement with the spring seat 16 of each of the coil springs 4. The arm members 19 are swingable around the pins 18, respectively, which are bridged between the disc plates 7, 8. The torsional shock absorbing apparatus 1 thus constructed can transmit the rotation torque of the disc plates 7, 8 to the boss 5.

As a consequence, the range of torsion angle of the disc plates 7, 8 and the boss 5 can be widened, and the torsional characteristic can be non-linearized, so that the rotation torque can stably be transmitted to the boss 5 from the disc plates 7, 8.

Figure 7:
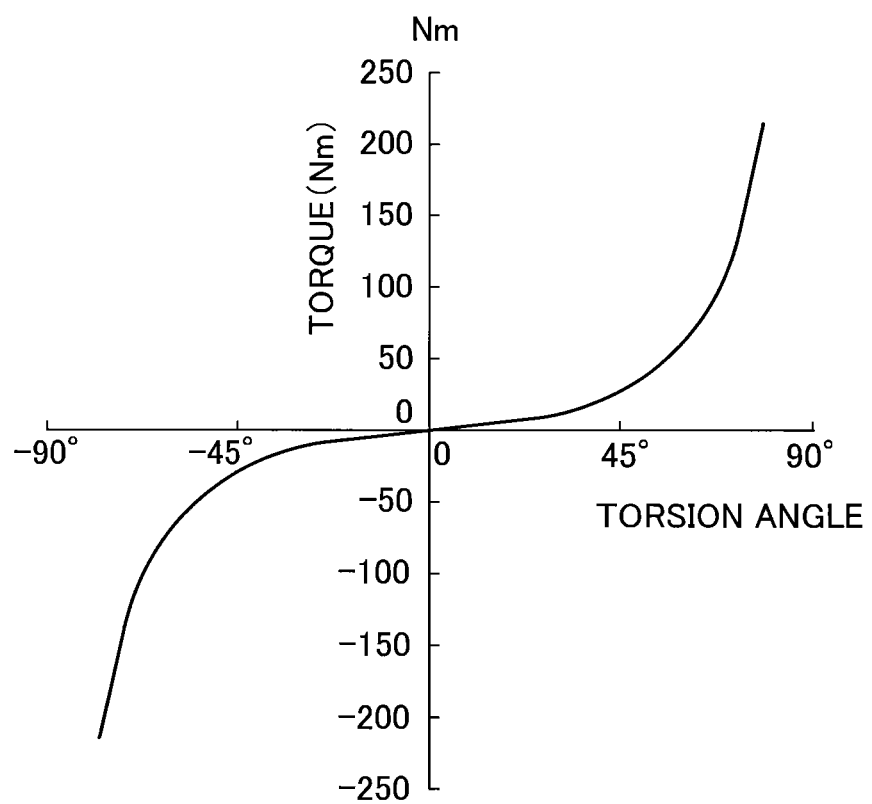
FIG. 7 is a view of the first embodiment of the torsional shock absorbing apparatus according to the present invention, and a view showing a torsional characteristic of the disc plates and the hub.

FIG. 7 is a view showing torsional characteristic of the disc plates 7, 8 and the boss 5, and a graph for explaining the relationship between the torsion angle of the disc plates 7, 8 and the boss 5 and the output torque to be outputted from the boss 5 in the present embodiment.

The horizontal axis indicates the torsion angle of the boss 5 twisted with respect to the disc plates 7, 8, while the vertical axis indicates the output torque outputted from the boss 5. The output torque on the vertical axis is corresponding to the reaction force of the boss 5 with respect to the disc plates 7, 8.

As shown in FIG. 7, in the present embodiment, as the torsion angle of the boss 5 with respect to the disc plates 7, 8 is increased, the coil springs 4 are compressed, thereby increasing the pressing forces caused by the arm members 19 against the cam member 6.

The increased pressing forces by the arm members 19 against the cam member 6 causes the output torque to be increased. The output torque fluctuation thus caused can give rise to the torsional characteristic represented by a curved line continuously varied without any steps.

In the present embodiment, the one end portions 19a of the arm members 19 are held in slidable contact with the cam surface 6a formed in an elliptic shape, so that the torsion angle of the disc plates 7, 8 and the boss 5 is increased in response to the rotation of the cam member 6 in the positive and negative sides totaling 180 degrees, thereby making it possible to widen the range of the torsion angle of the disc plates 7, 8 and the boss 5.

Further, the torsional characteristic and the magnitude of the torsion angle at the time of the disc plates 7, 8 being relatively rotated with respect to the boss 5 can be set to have desired torsional characteristic and the torsion angle, respectively, by adjusting the shape of the cam surface 6a of the cam member 6, the spring constant of the coil spring 4, the shape of the arm member 19, and other factors.

Figure 8:
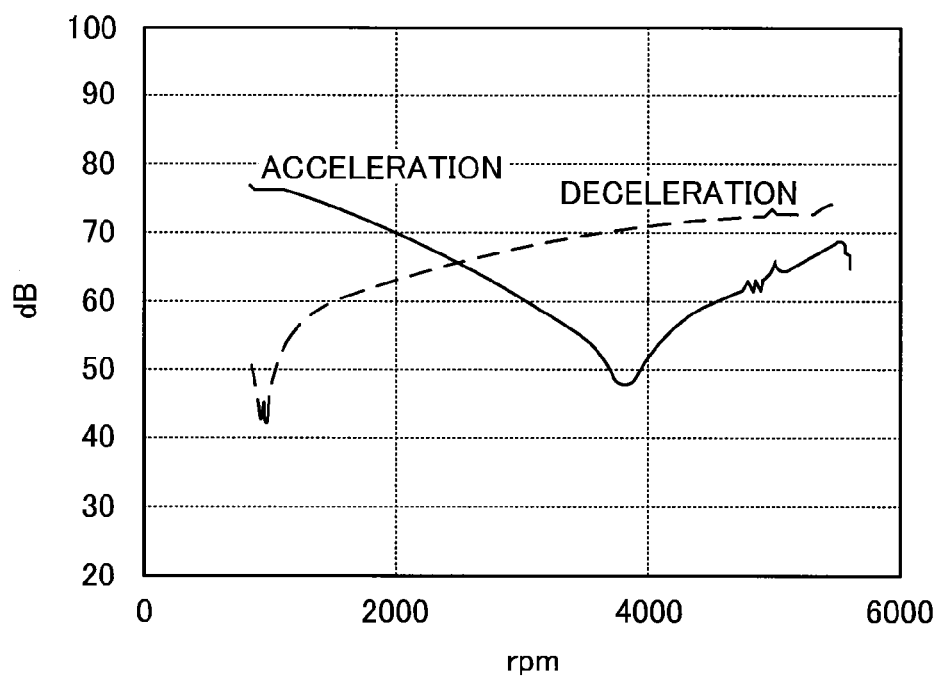
FIG. 8 is a view of the first embodiment of the torsional shock absorbing apparatus according to the present invention, and a view showing the relationship between the rotational fluctuation of the internal combustion engine and the rotation number of the internal combustion engine.

FIG. 8 is a view showing the relationship between the rotational fluctuation of the internal combustion engine and the rotation number of the internal combustion engine. This graph indicates that the rotational fluctuation of the internal combustion engine becomes larger in response to the lower rotation number of the internal combustion engine at the acceleration time of the vehicle, while the rotational fluctuation of the internal combustion engine has larger characteristic in response to the higher rotation number of the internal combustion engine by what is called engine brake is generated at the deceleration time of the vehicle.

In general, the torsional resonance point of the power transmission train provided with the transmission is generated at the steady rotation number (2500 rpm) of the internal combustion engine. In the present embodiment, the torsional resonance of the power transmission train is also generated in the stage that the rotational fluctuation of the internal combustion engine is being lowered while the rotation number of the internal combustion engine is raised to 2500 rpm.

The present embodiment can decrease the rigidity of the disc plates 7, 8 and the boss 5 to a small value when the torsion angle of the disc plates 7, 8 and the boss 5 is small, so that in the small area of the torque (output torque of the boss 5) in which the rotation torque to be transmitted to the boss 5 from the disc plates 7, 8 like the time when the vehicle is changed to its neutral position under its idling operation state, the torsional shock absorbing apparatus according to present embodiment can attenuate the torsional vibrations originated from the rotational fluctuation caused by the torque fluctuation of the internal combustion engine, thereby making it possible to suppress the "gara sounds" generated from the gear pairs of the transmission maintained in the no-load operation of the vehicle.

The torsional shock absorbing apparatus according to present embodiment can widen the range of the torsion angle of the disc plates 7, 8 and the boss 5. This makes it possible for the torsional shock absorbing apparatus to attenuate the torsional vibrations originated from the rotational fluctuation caused by the torque fluctuation of the driving source at the time of the acceleration in the low speed stage of the vehicle or at the time of the deceleration of the vehicle when the rotation torque to be transmitted from the disc plates 7, 8 to the boss 5 is large, thereby making it possible to suppress the rattling noises "jara sounds" generated from collisions of the idling gear pairs of the transmission gear set.

The torsional shock absorbing apparatus according to the present embodiment can set the torsional rigidity to a high level matched to the torsional resonance point, and thus can attenuate the torsional vibrations caused by the torsional vibrations of the power transmission train, thereby making it possible to suppress the muffled sounds from being generated in the vehicle room by the vibrations caused by the torsional resonance of the power transmission train originated from the torque fluctuation of the power transmission train.

The previously mentioned torsional characteristic can be made in the form of a non-linear but not in the form of a multistage having stepped portions as seen in the conventional apparatuses, thereby making it possible to suppress the "ga sounds" noisy for the driver. In other words, the torsional shock absorbing apparatus according to present embodiment can suppress the abnormal sounds such as the sounds of the colliding gears caused by the rebounding forces of the gears transmitting the rotation torque in the transmission at the time of about zero degree in the torque transmitted to the boss 5 from the disc plates 7, 8 in the travelling state under the slow deceleration of the vehicle and other factors.

Further, in the case that the disc plates 7, 8 are inputted with the extremely large torque from the internal combustion engine, the one end portions 19*a* of the arm members 19 override the apex portion 6*b* having the largest curvature in the sections of the cam surface 6*a* as shown in FIG. 6 to enable the disc plates 7, 8 to become idle with respect to the cam member 6, thereby making it possible to have the cam member 6 function as a torque limiter.

As a consequence, the torsional shock absorbing apparatus according to present embodiment can prevent the extremely large torque from being transmitted to the boss 5 from the disc plates 7, 8, and thus can protect transmitting gear sets of the transmission.

The torsional shock absorbing apparatus according to present embodiment is constituted as previously mentioned by the coil springs 4 disposed between the disc plates 7, 8 and the boss 5, the arm members 19, and the boss 5, and thus is simple in construction to enable the range of the torsion angle of the disc plates 7, 8 and the boss 5 to be widened, so that the torsional shock absorbing apparatus 1 as a whole can be simplified in construction.

The torsional shock absorbing apparatus according to present embodiment is constituted partly by the arm members 19 which are disposed in point-symmetrical relationship with each other with respect to the common center axis of the disc plates 7, 8 to enable the arm members 19 to sandwich and retain the cam member 6 across the common center axis of the disc plates 7, 8.

For this reason, when the coil springs 4 are urged by the cam member 6 through the arm members 19, the reaction forces of the coil springs 4 are generated, so that the arm members 19 can sandwich and retain the cam member 6 under a strong pressing power caused by the reaction forces across the common center axis of the disc plates 7, 8. This makes it possible to reliably transmit the rotation torque from the disc plates 7, 8 to the boss 5.

The torsional shock absorbing apparatus according to present embodiment is constituted by the coil springs 4 accommodated in the accommodation windows 14, 15 of the disc plates 7, 8, the spring seats 16, 17 supporting the circumferential both end portions of the coil springs 4 at the circumferential both ends of the accommodation windows 14, 15, and the arm members 19 having the other end portions 19*b* held in engagement with the one end portions of the coil springs 4 through the spring seats 16, so that the coil springs 4 can resiliently be deformed to generate the urging forces of the coil springs 4, and thus can reliably transmit the rotation torque to the cam member 6 through the arm members 19.

The torsional shock absorbing apparatus according to present embodiment is constituted by the pins 18 bridged between the disc plates 7, 8 to securely connect the disc plates 7, 8 and to swingably support the arm members 19, thereby making it possible to have the arm members 19 supported on the disc plates 7, 8 with the simple construction. The disc plates 7, 8 connected by the pins 18 makes it possible to have the disc plates 7, 8 integrally united with the simple construction.

Example 2

Figure 9:
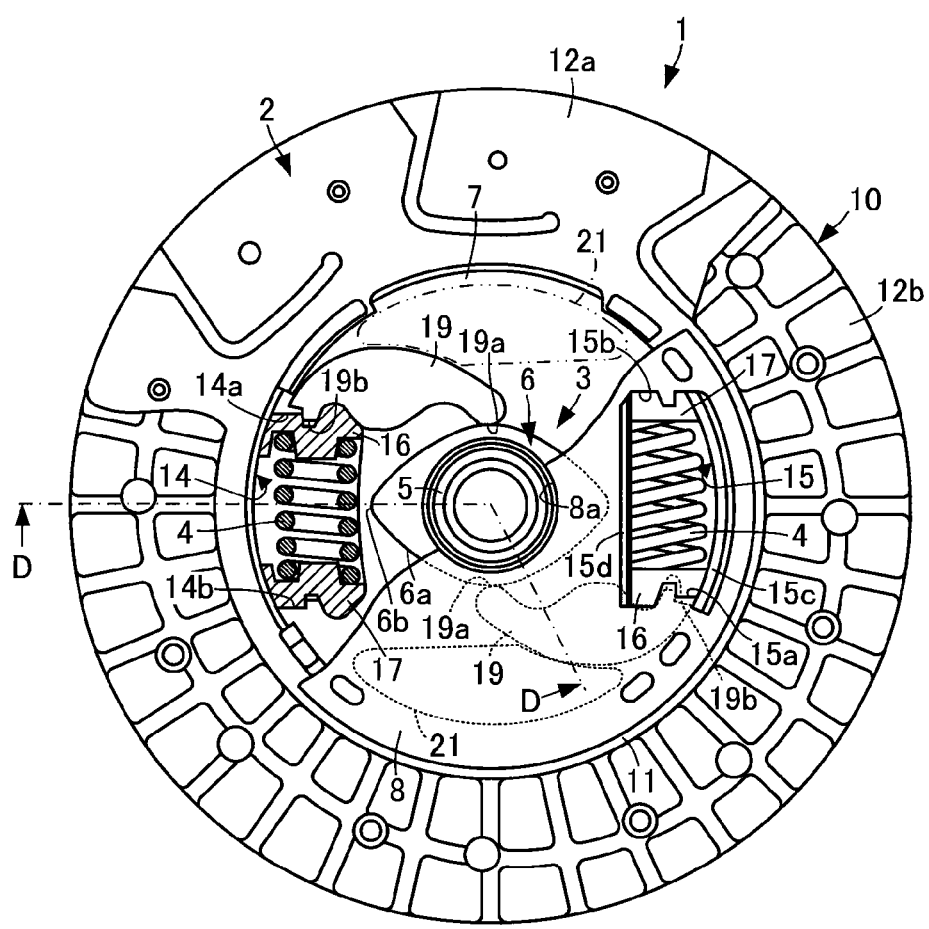
FIG. 9 is a view of a second embodiment of the torsional shock absorbing apparatus according to the present invention, and a front view of the torque fluctuation absorbing apparatus.
Figure 10:
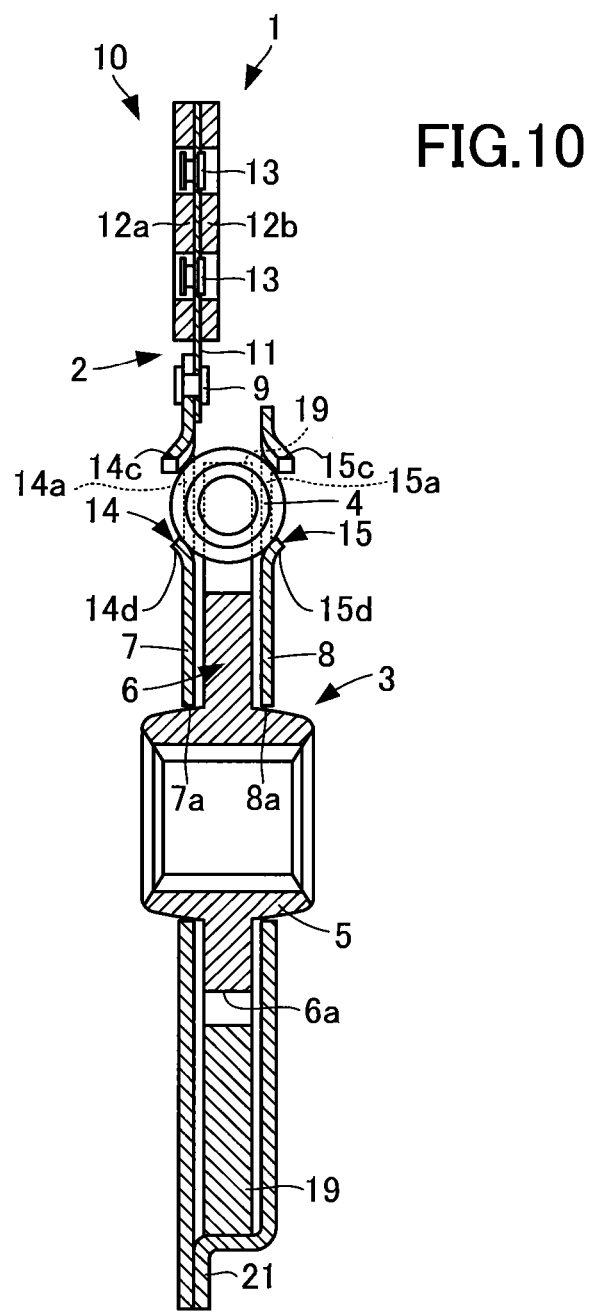
FIG. 10 is a view of the second embodiment of the torque torsional shock apparatus according to the present invention, and a cross-sectional view taken on and seen from the line D-D in FIG. 9.
Figure 11:
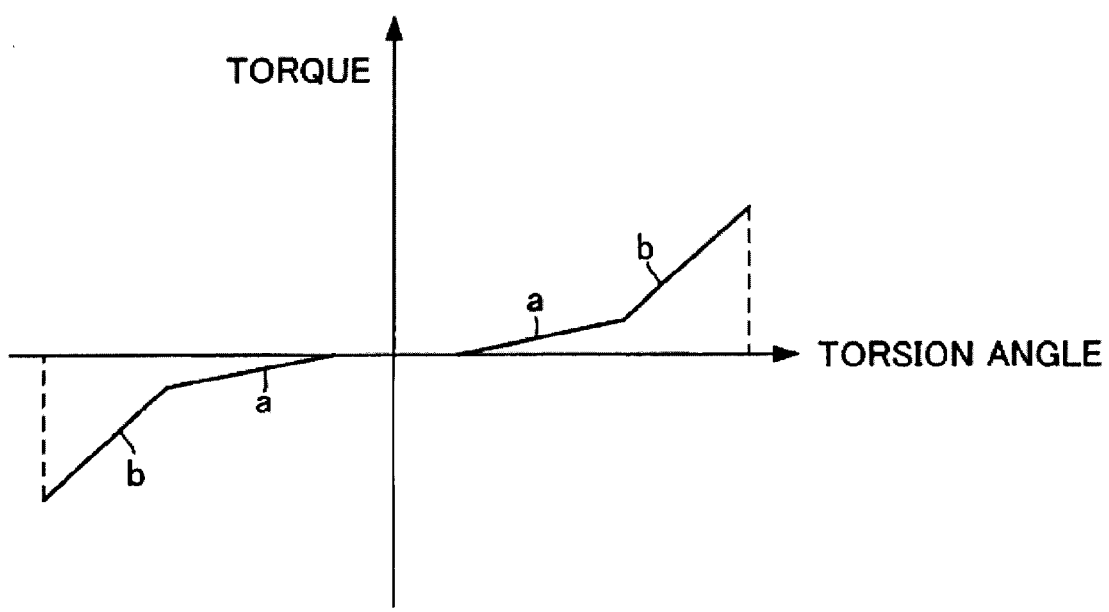
FIG. 11 is a view showing a torsional characteristic of disc plates and a hub forming parts of a conventional torsional shock absorbing apparatus.

The torsional shock absorbing apparatus according to the second embodiment will be explained hereinafter with reference to FIGS. 9 and 10. The constitution parts and elements forming the second embodiment the same as those of the first embodiment bear the same reference numerals as those of the first embodiment, and their explanation will not be made hereinafter. The disc plate 8 is shown in FIGS. 9 and 10 to be formed with a bent portion 21 serving as a swing fulcrum portion, the bent portion 21 being formed by bending the radially outer portion of the disc plate 8 in an axially inward direction toward the disc plate 7 to extend in the circumferential direction of the disc plate 8, and having a predetermined length.

Each of the arm members 19 in the present embodiment has an outer peripheral section between the one end portion 19*a* and the other end portion 19*b* to be in slidable contact with the inner peripheral surface of the bent portion 21 of the disc plate 8, the arm member 19 being swingable on the inner peripheral surface of the bent portion 21. In FIG. 9, the disc plate 8 has no bent portion formed thereon; however, the disc plate 7 has a bent portion 21 shown in phantom line to support the arm member 19 at the upper position.

In this way, in the present embodiment, the disc plate 8 is formed with the bent portion 21, and the arm member 19 is adapted to be swung on the inner peripheral surface of the bent portion 21, so that the arm member 19 can be supported on the disc plates 7, 8 by the simple construction.

Further, in the present embodiment, the desired section of the outer peripheral surface of the arm member 19 is in slidable contact of the inner peripheral surface of the bent portion 21, so that the arm member 19 can be pressed against the inner peripheral surface of the bent portion 21 by a strong pressing power when the torsion angle of the disc plates 7, 8 and the boss 5 is increased to enlarge the reaction force of the coil spring 4 to the arm member 19. This makes it possible to increase the sliding resistance caused by the outer peripheral surface of the arm member 19 and the inner peripheral surface of the bent portion 21 at the time of swinging the arm member 19, and thus to generate a large hysteresis.

For this reason, the hysteresis between the disc plates 7, 8 and the boss 5 can be increased when the torsional resonance of the power transmission train is generated at the acceleration and deceleration times of the vehicle. This means that the torsional resonance can be even further suppressed, and the muffled sounds can be even further suppressed from being generated.

The present embodiment is constructed to have no pin 18 for swingably supporting the arm member 19, the disc plates 7, 8 may be connected by the pin the same in construction as that of the first embodiment.

Further, the disc plate 8 may have radially outer portion formed with a bent portion extending toward the disc plate 7, the bent portion being secured to the disc plate 7 by the rivets 9 to integrally connect the disc plates 7, 8. Further, the above embodiments, there are provided two arm members 19, however, only one arm member may be available for the torsional shock absorbing apparatus according to the present invention. Although the above embodiments have been explained to have a pair of arm members 19 which function to transmit the rotation torque at two places on the cam member 6, the cam member 6 may be formed with three arcuate surface sections which are in slidable contact with three arm members, respectively, at the three surface places of the cam member 6 to transmit the rotation torque according to the present invention.

Further, the disc plate 7 may partly be formed with a bent portion serving as a swing fulcrum portion and forming together with the above bent portion 21 formed on the disc plate 8 on which the arm members 19 are swingably supported. In this case, the bent portion formed on the disc plate 7 and the bent portion 21 formed on the disc plate 8 is thus constructed to axially extend in opposing relationship with each other. Only one bent portion may be formed on the disc plate 7 with no bent portion 21 formed on the disc plate 8 according to the present invention.

Although the above description for the present embodiment has been directed to the case that the driving rotation member is constituted by the clutch disc 10 and the disc plates 7, 8 while the driven rotation member is constituted by the boss 5, the driving rotation member may be constituted by the disc plates 7, 8 while the driven rotation member may be constituted by the boss 5 according to the present invention.

Though the torsional shock absorbing apparatus according to the present embodiment is interposed between the internal combustion engine of the vehicle and the power transmission train having the transmission, the present invention is not limited to this construction, but can be applied to any type of torsional shock absorbing apparatus if the torsional shock absorbing apparatus has a driving source for transmitting the rotation toque to the driving rotation member, and the power transmission train to which the rotation toque output from the driven rotation member is transmitted The previously disclosed embodiments are exemplary in all aspects, however, the present invention is not limited to these embodiments. The scope defined in claims as the present invention should be construed to include equivalents and modifications within the spirit of the present invention.

From the foregoing description, it will be understood that the torsional shock absorbing apparatus according to the present invention is of advantageous effect that can acquire non-linear torsional characteristic having a large torsion angle of the driving rotation member and the driven rotation member, and can prevent the extremely large torque from being transmitted from the driving rotation member to the driven rotation member. The torsional shock absorbing apparatus according to the present invention is useful as a torsional shock absorbing apparatus which is constructed to have the driving rotation member inputted with the rotation torque rotatably connected with the driven rotation member outputting the rotation torque by the resilient member.

REFERENCE SIGNS LIST

1: torsional shock absorbing apparatus
2: driving rotation member
3: driven rotation member
4: spring (resilient member)
5: boss (first rotation member)
6: cam member
6*a*: cam surface
7, 8: disc plate (second rotation member)
10: clutch disc (second rotation member)
14, 15: accommodation window
14*c*, 15*c*: outer supporting edge portion (accommodation portion)
14*d*, 15*d*: inner supporting edge portion (accommodation portion)
16, 17: spring seat (retaining member)
18: pin (swing fulcrum portion)
19: arm member (torque transmission member)
19*a*: one end portion
19*b*: the other end portion
21: bent portion (swing fulcrum portion)

The invention claimed is:

1. A torsional shock absorbing apparatus, comprising:
a driving rotation member inputted with a rotational torque;
a driven rotation member disposed in coaxial relationship with the driving rotation member to output the rotational torque of the driving rotation member;
at least one or more resilient members provided between the driving rotation member and the driven rotation member to be compressed in the circumferential direction of the driving rotation member when the driving rotation member and the driven rotation member are relatively rotated with each other;
a cam member having a cam surface formed in an oval shape and provided at one of the driving rotation member and the driven rotation member to be integrally rotated with the one of the driving rotation member and the driven rotation member; and
at least one or more torque transmission members each disposed between the cam member and a corresponding one resilient member of the at least one or more resilient members to transmit the rotational torque of the driving rotation member to the driven rotation member,
in which each of the at least one or more torque transmission members includes an arm member having one end portion held in contact with the cam surface of the cam member and the other end portion held in engagement with a circumferential one end portion of the corresponding one resilient member, the arm member being swingably supported on and around a swing fulcrum portion provided on another of the driving rotation member and the driven rotation member.

2. The torsional shock absorbing apparatus as set forth in claim 1, in which the cam member has an initial position where the driving rotation member and the driven rotation member are twisted at a smallest torsion angle, and the cam surface of the cam member has a curvature increased in response to the torsion angle increased from the initial position of the cam member.

3. The torsional shock absorbing apparatus as set forth in claim 1, in which the at least one or more torque transmission members are disposed in point-symmetrical relationship with each other with respect to the center axis of the driving rotation member.

4. The torsional shock absorbing apparatus as set forth in claim 1, in which
the driven rotation member has an outer peripheral portion having the cam member, and an inner peripheral portion provided with a first rotation member connected with an input shaft of a transmission, the driving rotation member has a pair of second rotation members disposed at the axially both ends of the first rotation member and in spaced relationship with and secured with each other, the driving rotation member having an accommodation portion to circumferentially extend for accommodating the corresponding one resilient member therein, and a pair of retaining members supporting circumferential both end portions of the corresponding one resilient member to have the corresponding one resilient member supported on circumferential both end portions of the accommodation portion, the other end portion of the arm member being held in engagement with the circumferential one end portion of the corresponding one resilient member through one of the pair of retaining members.

5. The torsional shock absorbing apparatus as set forth in claim 1, in which the swing fulcrum portion is constituted by a pin bridged and supported on the pair of second rotation members, the arm member being disposed between the pair of second rotation members and swingably supported on the pin.

6. The torsional shock absorbing apparatus as set forth in claim 1, in which the swing fulcrum portion is constituted by a bent portion formed on one of the pair of second rotation members, the bent portion being formed by bending its radially outer portion in an axially inward direction toward the other of the pair of second rotation members to extend in the circumferential direction of the second rotation members, and having a predetermined length, the arm member is disposed between the pair of second rotation members, and has a desired outer peripheral surface held in slidable contact with the inner peripheral surface of the bent portion to allow the arm member to be swingable on the inner peripheral surface of the bent portion.

* * * * *